United States Patent
Chen et al.

(10) Patent No.: US 7,600,026 B2
(45) Date of Patent: Oct. 6, 2009

(54) APPARATUS AND METHOD FOR NAT/NAPT SESSION MANAGEMENT

(75) Inventors: Jin-Ru Chen, TaiChung (TW); Chun-Feng Liu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 966 days.

(21) Appl. No.: 10/396,776

(22) Filed: Mar. 26, 2003

(65) Prior Publication Data

US 2003/0200318 A1 Oct. 23, 2003

(30) Foreign Application Priority Data

Mar. 29, 2002 (TW) .............................. 91106245 A (51) Int. Cl.
*G06F 15/16* (2006.01)
(52) U.S. Cl. ........................ 709/227; 709/224; 709/225; 709/226; 709/238; 370/230; 370/389; 370/392; 370/401
(58) Field of Classification Search ......... 709/224–227, 709/238; 370/230, 392, 389, 401
See application file for complete search history.

(56) References Cited

U.S. PATENT DOCUMENTS

| | | | | | |
|---|---|---|---|---|---|
| 6,055,236 | A * | 4/2000 | Nessett et al. ............... | 370/389 |
| 6,058,431 | A * | 5/2000 | Srisuresh et al. ............ | 709/245 |
| 6,269,099 | B1 * | 7/2001 | Borella et al. ............... | 370/389 |
| 6,331,984 | B1 * | 12/2001 | Luciani ....................... | 370/401 |
| 6,353,614 | B1 * | 3/2002 | Borella et al. ............... | 370/389 |
| 6,381,638 | B1 * | 4/2002 | Mahler et al. ............... | 709/220 |
| 6,418,476 | B1 * | 7/2002 | Luciani ....................... | 709/238 |
| 6,549,516 | B1 * | 4/2003 | Albert et al. ................ | 370/236 |
| 6,563,824 | B1 * | 5/2003 | Bhatia et al. ................ | 370/392 |
| 6,597,700 | B2 * | 7/2003 | Golikeri et al. ............. | 370/401 |
| 6,608,830 | B1 * | 8/2003 | Hirano et al. ............... | 370/351 |
| 6,650,641 | B1 * | 11/2003 | Albert et al. ................ | 370/392 |
| 6,687,245 | B2 * | 2/2004 | Fangman et al. ........... | 370/356 |
| 6,775,692 | B1 * | 8/2004 | Albert et al. ................ | 709/207 |
| 6,779,035 | B1 * | 8/2004 | Gbadegesin ................ | 709/228 |
| 6,795,816 | B2 * | 9/2004 | Costantini et al. ............. | 707/1 |
| 6,816,455 | B2 * | 11/2004 | Goldberg et al. ............ | 370/230 |
| 6,826,613 | B1 * | 11/2004 | Wang et al. ................. | 709/227 |
| 6,892,245 | B1 * | 5/2005 | Crump et al. ............... | 709/245 |
| 7,068,655 | B2 * | 6/2006 | March et al. ................ | 370/392 |
| 2003/0065817 | A1 * | 4/2003 | Benchetrit et al. .......... | 709/245 |
| 2003/0172184 | A1 * | 9/2003 | Kong .......................... | 709/245 |

* cited by examiner

*Primary Examiner*—John Follansbee
*Assistant Examiner*—Saket K Daftuar
(74) *Attorney, Agent, or Firm*—Thomas, Kayden, Horstemeyer & Risley (57) ABSTRACT

The present invention provides an apparatus and method for NAT/NAPT session management used in a network switch controller. The apparatus comprises a translation table for storing related information of NAT/NAPT sessions, a register for storing setting values required by the apparatus, and a control logic for managing the NAT/NAPT sessions based on the setting values stored in the register and the related information in the translation table. The apparatus offers a connection time to each NAT/NAPT session and decreases it every unit time. When it is reduced to zero, the related information of the session is invalidated and the session is then disconnected. The apparatus stores related information of NAT/NAPT sessions and offers associated connection time and unit time based on the protocols used, thereby invalidating the related information timely to empty part of the translation table for storing related information of other sessions. Thus, efficient and automatic management for NAT/NAPT sessions is achieved to avoid that limited translation table is occupied by time-exceeded or disconnected sessions, thereby upgrading NAT/NAPT performance.

17 Claims, 6 Drawing Sheets

| USED | connection time | source IP | source port | protocol-specific information |
|---|---|---|---|---|
| 31 | 32 | 33 | 34 | 35 |

| Connection Indication (CI) | CI=0 | a session is not fully established and waits for two-way SYN control packets |
|---|---|---|
| | CI=1 | a session is fully established and waits for two-way FIN control packets |
| Internal Tag (IT) | CI=0, IT=0 | a SYN control packet sent from the interior to the exterior is not received |
| | CI=0, IT=1 | a SYN control packet sent from the interior to the exterior is received |
| | CI=1, IT=0 | a FIN control packet sent from the interior to the exterior is not received |
| | CI=1, IT=1 | a FIN control packet sent from the interior to the exterior is received |
| External Tag (ET) | CI=0, ET=0 | a SYN control packet sent from the exterior to the interior is not received |
| | CI=0, ET=1 | a SYN control packet sent from the exterior to the interior is received |
| | CI=1, ET=0 | a FIN control packet sent from the exterior to the interior is not received |
| | CI=1, ET=1 | a FIN control packet sent from the exterior to the interior is received |

APPARATUS AND METHOD FOR NAT/NAPT SESSION MANAGEMENT

BACKGROUND OF THE INVENTION (a). Field of the Invention

The present invention relates in general to the field of network session management, and more particularly to an apparatus and method that can render a specific period of connection time to an NAT/NAPT session based on its properties, thereby disconnecting the session timely to achieve effective and automatic session management.

(b). Description of the Prior Arts

In recent years, the Internet becomes more and more popular, and forms an overwhelming global trend. The Internet transceives data by using TCP/IP protocols that adopt IP addressing system, which renders a unique IP address to each network node on the Internet to facilitate the transmission of the data. The current IP version number is 4 (known as IPv4, cf. RFC 791). According to IPv4, an IP address comprises 32 bits that are grouped into four 8-bit sections. Since each section has $2^8=256$ possible combinations, there are $256^4$ available IP addresses theoretically (in fact, usable IP addresses are less than that since part of IP addresses are reserved for other purposes).

However, as there are exponentially increasing computers that need to connect to the Internet, IP addresses may not be enough in some situations. A common case is that the number of IP addresses is less than that of network nodes in a local area network (LAN). Since an IP is necessary for each node to access the Internet, insufficient IP addresses would prevent some nodes in the LAN from connecting to the Internet. To solve this problem, Network Address Translation (NAT) and Network Address-Port Translation (NAPT) are developed.

Before making a description for NAT and NAPT, concepts of public IP and private IP are introduced here. A public IP is a normal IP used in various networks which employ TCP/IP protocols, while a private IP is only used in a local area network, such as the internal network of an institution or family. That is, the private IP cannot be used to connect directly to external networks (e.g. the Internet). The Internet Assigned Number Authority (IANA) reserves three sections of IP addresses for internal networks:

10.0.0.0-10.255.255.255
172.16.0.0-172.31.255.255
192.168.0.0-192.168.255.255

The above private IP addresses are only used in internal networks, and there's no need to register them.

Figure 1:
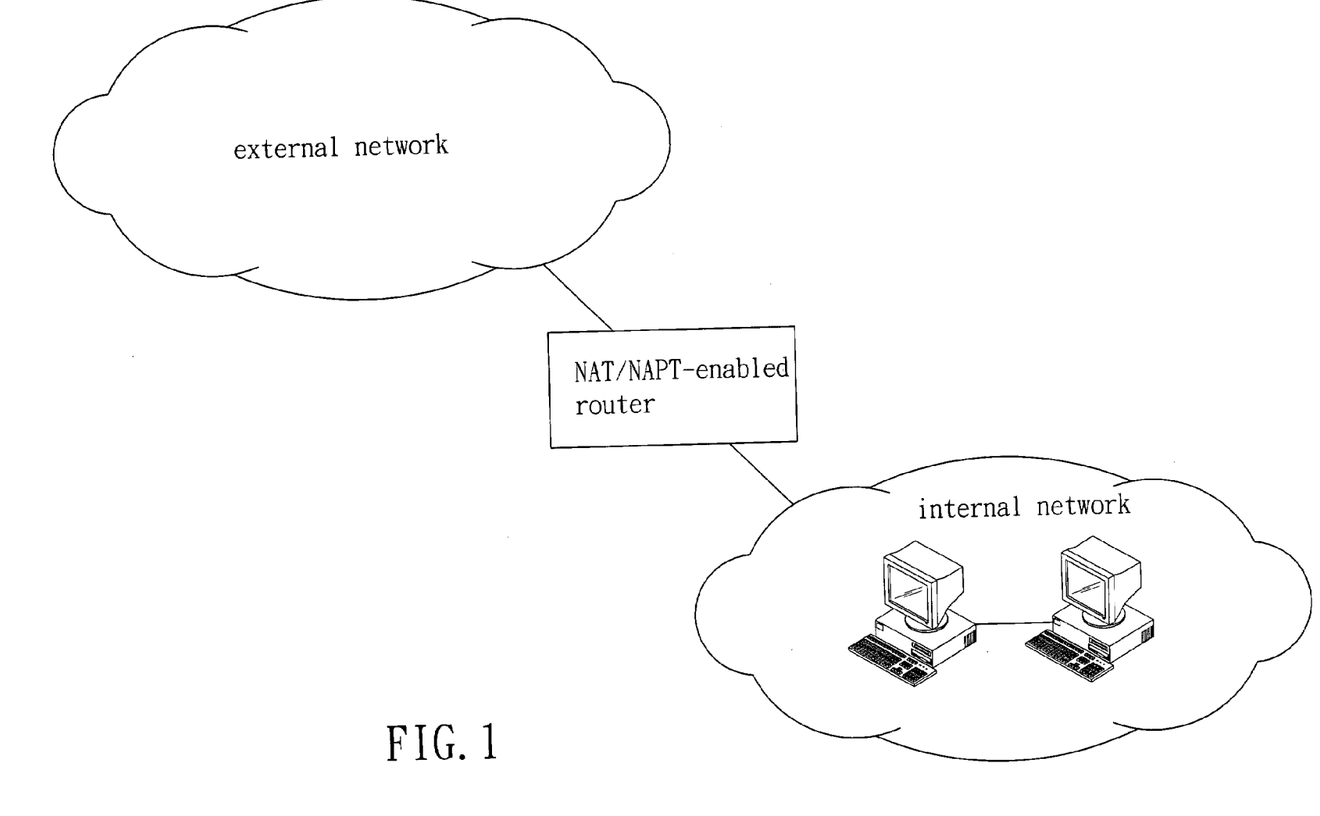
FIG. 1 is a diagram showing that nodes with private IPs in an internal network connect to an external network via a NAT/NAPT-enabled router.

If a network node with a private IP wants to access external networks, a NAT/NAPT-enabled equipment, such as a router, is needed, as shown in FIG. 1. The operation of NAT can be described as follows: when a node with a private IP in an internal network is to transmit packets to external networks, the NAT equipment would first translate the source address (i.e. the private IP) of the packets into an available public IP and then transmit the packets. The NAT equipment would keep a record of the correspondence between the private IP and the public IP; when the external networks are to transmit a packet to the internal network, the NAT equipment would look up the record. If the NAT equipment finds that there is a public IP matching the destination address of the packet, then it translates the destination address into a private IP corresponding to the public IP and forwards the packet to a node with this private IP. Because of one-to-one correspondence between public IPs and private IPs, N public IPs can only serve for N private IPs.

Comparing to NAT, NAPT further translates the port, which belongs to Layer 4 of the Open Systems Interconnection (OSI) model, of a packet in addition to IP translation. When a packet is transmitted from an internal network to an external network, NAPT translates the source IP and the source port of the packet; when a packet is transmitted from an external network to an internal network, NAPT translates the destination IP and the destination port of the packet. The "port" can generally refer to the port number field defined in Transmission Control Protocol (TCP)/User Datagram Protocol (UDP), or the identifier field defined in Internet Control Message Protocol (ICMP). In NAPT, correspondence between private IPs and public IPs is not one-to-one, and thus more computers can connect to the Internet simultaneously by using different combinations of public IPs and associated ports.

If NAT/NAPT is implemented by an application-specific integrated circuit (ASIC), then the operation speed is faster. When a node with a private IP in an internal network is to access an external network, it would send out a packet to establish a network session, which refers to a period of time for two nodes maintaining their connection. In the present specification, a NAT/NAPT session is referred to a session in which NAT/NAPT is performed. Besides, since the main topic of the present invention is the NAT/NAPT session, a "session" may be used to represent a "NAT/NAPT session" below in the specification. A NAT/NAPT-enabled switch controller has a built-in translation table for storing information associated with NAT/NAPT sessions, for example the source IP and the source port of packets transmitted from an internal network to external networks. The information is provided for use in performing address (and port) translation for subsequent packets of the NAT/NAPT sessions.

The built-in translation table is typically implemented with a cache memory to achieve higher performance. However, in consideration of efficiency and cost, the size of the cache memory is limited. Therefore, the information stored in the translation table is also limited.

In view of this, the present invention provides an apparatus and method for NAT/NAPT session management that can make good use of the limited translation table in a switch controller, thereby upgrading NAT/NAPT performance of the switch controller.

SUMMARY OF THE INVENTION

The first object of the present invention is to provide an apparatus and method for NAT/NAPT session management used in a NAT/NAPT-enabled switch controller. The apparatus and method can manage NAT/NAPT sessions automatically, thereby upgrading NAT/NAPT performance of the switch controller.

To achieve this object, the apparatus lies in a switch controller containing a packet translation module used to perform NAT/NAPT for packets. The apparatus comprises: a translation table for storing information associated with the NAT/NAPT sessions; a register for storing related setting values required by the apparatus; and a control logic for managing the NAT/NAPT sessions based on the setting values stored in the register and the information in the translation table.

The method for managing the NAT/NAPT sessions comprises providing a connection time, which is stored in the translation table, to each NAT/NAPT session, decreasing the connection time every unit time, and invalidating the information associated with the NAT/NAPT session in the translation table as the connection time becomes zero, thereby stopping NAT/NAPT for the session and then disconnecting the session. The essential nature of the method lies in providing various lengths of connection time and unit time based on properties of various protocols used by NAT/NAPT sessions, thereby disconnecting the sessions timely and freeing space of the translation table for storing information associated with other NAT/NAPT sessions. Therefore, efficient and automatic management for NAT/NAPT sessions is achieved to avoid that limited translation table is occupied by time-exceeded or disconnected sessions, thereby upgrading NAT/NAPT performance.

The second object of the present invention is to extend the above method to manage NAT/NAPT sessions using UDP, ICMP and TCP respectively. UDP, ICMP and TCP are very common network protocols, and the managing methods provided by the present invention comprise mainly storing required information associated with NAT/NAPT sessions based on properties of these protocols, selecting optimal setting values in the register to enable the above apparatus to handle connection time of different sessions based on the information and the setting values, and invalidating the information associated with the sessions to empty part of the translation table for storing information associated with other sessions, thereby utilizing the limited translation table more efficiently.

DETAILED DESCRIPTION OF THE PRESENT INVENTION

Figure 2:
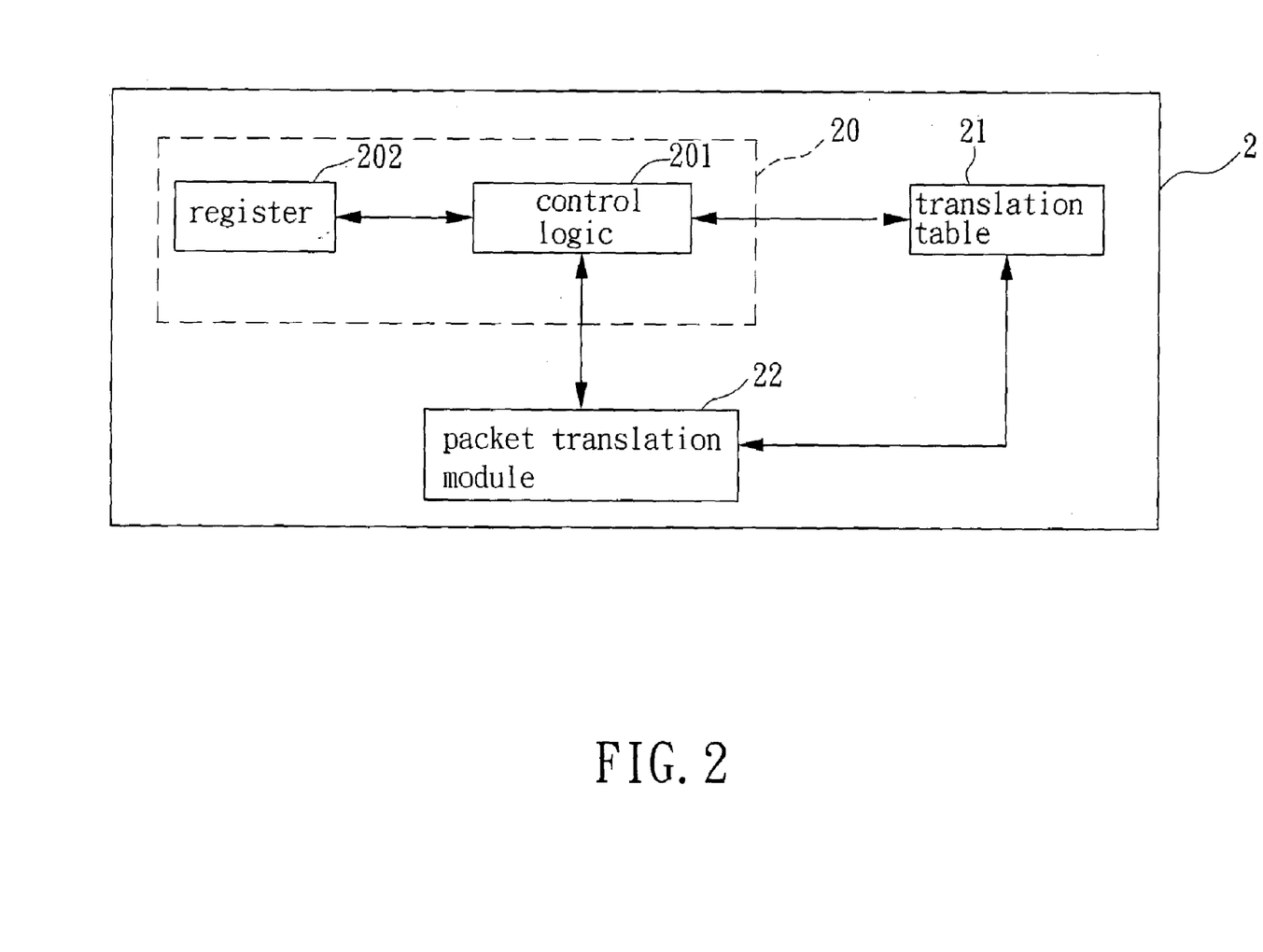
FIG. 2 is a block diagram of a preferred embodiment of the apparatus for NAT/NAPT session management according to the present invention.

A detailed description with one preferred embodiment and appended drawings is provided below to make goals and features of the present invention apparent to understand. Please refer to FIG. 2, which is a block diagram of a preferred embodiment of the apparatus for NAT/NAPT session management according to the present invention. As shown in FIG. 2, the apparatus 20 lies in a network switch controller 2. The switch controller 2 contains a packet translation module 22 which performs NAT/NAPT for packets. The apparatus 20 comprises: a translation table 21, coupled to the packet translation module 22, for storing related information of NAT/NAPT sessions; a register 202 for storing related setting values required by the apparatus 20; and a control logic 201, coupled to the packet translation module 22, the translation table 21, and the register 202, for managing the NAT/NAPT sessions based on the setting values stored in the register 202 and the related information in the translation table 21.

Figure 3:
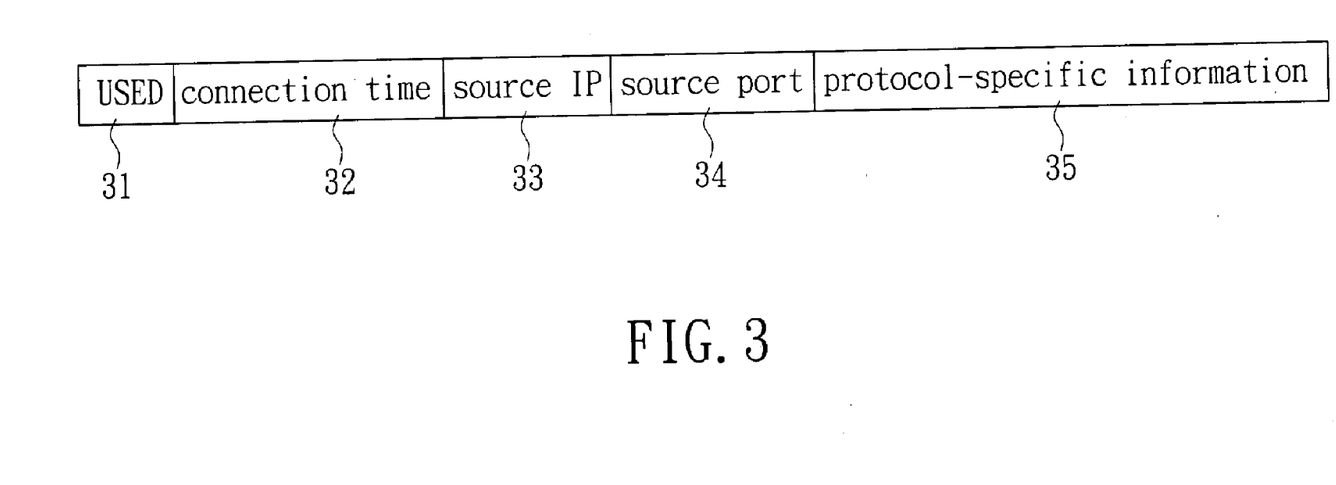
FIG. 3 is a block diagram illustrating a translation table entry format of the preferred embodiment.

The translation table 21 is used to record the related information of the NAT/NAPT sessions. In the preferred embodiment, the translation table 21 is implemented with a cache memory. It is notable that there is no limit for the type of the cache, thus a direct-mapped cache, a fully associative cache, or a multiway set-associative cache can be used here. The cache memory contains a plurality of entries, each of which stores related information of a NAT/NAPT session. FIG. 3 is a block diagram illustrating a translation table entry format of the preferred embodiment. As shown in FIG. 3, each entry includes below fields:

USED bit 31: used to indicate if the current entry is in use. If yes, then setting the USED bit 31 to show that related information recorded in the current entry is valid for performing NAT/NAPT for the associated NAT/NAPT session. On the contrary, if the current entry is not in use, then clearing the USED bit 31 to show that the recorded information is invalid and NAT/NAPT for the associated session is then stopped.

Connection time 32: used to indicate that how many unit times are left for keeping the connection of the associated NAT/NAPT session. The control logic 201 decreases the connection time 32 by one every unit time, wherein length of the unit time depends on the protocol used by the associated session.

Source IP 33: used to record the source IP (i.e. the IP of a node in an internal network, such as a private IP) of a packet transmitted from the internal network to an external network.

Source port 34: used to record the source port of the packet transmitted from the internal network to the external network.

Protocol-specific information 35: contents of this field depend on the protocol used by the associated NAT/NAPT session. One feature of the present invention is just to provide a proper managing method for different kinds of sessions, thus the control logic 201 would record related information of the associated NAT/NAPT session in this field based on the protocol used. However, this field is not necessary for each kind of NAT/NAPT session.

When receiving a packet, the packet translation module 22 would search the translation table 21 for a matching entry. For NAT, the matching entry means that the USED bit is set (i.e. the entry is in use) and the source IP 33 accords with the source IP or the destination IP of the received packet. If the source IP 33 accords with the former, it means that the packet is transmitted from an internal network (also called "the interior" below) in which the switch controller 2 is located to an external network (also called "the exterior" below); if the source IP 33 accords with the latter, then it means that the packet is transmitted from the exterior to the interior. For NAPT, the matching entry means that the source port 34 accords with the source port or the destination port of the packet in addition to the above conditions.

If the packet translation module 22 finds the matching entry, it would directly perform NAT/NAPT for the packet according to the source IP and source port recorded in the entry, and the control logic 201 would determine whether an update for related information stored in the entry is needed. If the packet translation module 22 cannot find the matching entry, then there is a need to establish a new NAT/NAPT session. The packet translation module 22 would search the translation table 21 for an unused or invalid entry, and the control logic 201 would write related information of the new session thereto. It should be stressed that the way in which the packet translation module 22 searches the translation table 21 and performs NAT/NAPT does not influence the object of upgrading performance according to the present invention.

The register 202 is used to store the related setting values required by the apparatus 20, for example the connection time 32 required by various NAT/NAPT sessions using different protocols, the length of unit time used to decrease the connection time 32, etc. These values can be accessed by the control logic 201.

Figure 4:
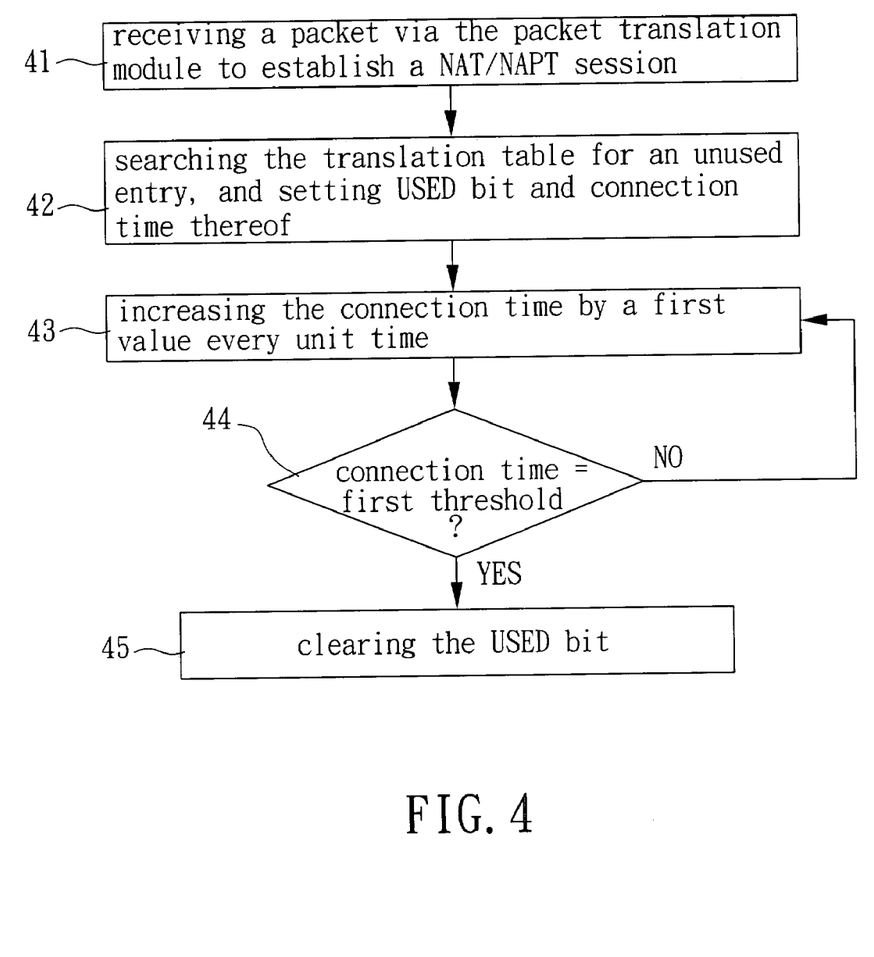
FIG. 4 is a flow chart of the method for NAT/NAPT session management according to the present invention.

Next, a detailed description is provided to explain how to employ the apparatus 20 to implement the method for NAT/NAPT session management. FIG. 4 is a flow chart of the method for NAT/NAPT session management according to the present invention. As shown in FIG. 4, the flow comprises steps of:

41 the switch controller 2 receiving a packet via the packet translation module 22 to establish an NAT/NAPT session;

42 the packet translation module 22 searching the translation table 21 for an unused or invalid entry, and the control logic 201 setting the USED bit 31 of the entry and storing the connection time 32 associated with the NAT/NAPT session into the entry, wherein an initial value of the connection time 32 is predetermined as T;

43 the control logic 201 increasing the connection time 32 by a first value every unit time (presumed as U seconds);

44 the control logic 201 checking if the connection time 32 reaches a first threshold, if no then jumping to the step 43; and 45 if the connection time 32 reaches the first threshold, then the control logic 201 clears the USED bit 31 to invalidate the entry.

In the steps 43 and 44, the first value and the first threshold can be chosen as −1 and 0 respectively for simple implementation. In the step 45, if an entry is invalidated, then it can be used to store information associated with another NAT/NAPT session.

In the above steps, T, U, the first value and the first threshold are stored in the register 202 and set by the control logic 201 based on the protocol which the NAT/NAPT session uses. One skilled in the art can select optimal setting values for the control logic 201 to control the connection time 32 of various sessions and to invalidate information associated with the sessions timely, thereby utilizing limited space of the translation table 21 efficiently.

Further, the steps 41 to 45 are indifferent to whether a session is a NAT session or a NAPT session, so the above method can be applied to both NAT sessions and NAPT sessions. In sum, as long as the switch controller 2 uses entries of the translation table 21 as shown in FIG. 3 to record related information of NAT/NAPT sessions, the above method can help the switch controller 2 to manage the NAT/NAPT sessions automatically and efficiently.

Based on the above method, the present invention further provides managing methods of NAT/NAPT sessions for three network protocols UDP, ICMP and TCP respectively. We will use "UDP session", "ICMP session" and "TCP session" to represent NAT/NAPT sessions employing UDP, ICMP and TCP respectively. In addition, the first value in the step 43 and the first threshold in the step 44 are preferably chosen as −1 and 0.

Firstly, in the aspect of UDP sessions, since UDP, defined in RFC 768, is a connectionless transport-layer protocol based on Internet Protocol, UDP packets are routed to destination addresses without need to check whether the connections with the destination addresses of the packets are established. The present invention extends the steps 41-45 as follows for UDP sessions:

(1) In the step 41, the packet that the switch controller 2 receives is a UDP packet, and the NAT/NAPT session established is a UDP session. The initial value T of the connection time 32 in the step 42 is equal to a default value of $T_{udp}$, while the unit time U in the step 43 is equal to $U_{udp}$. Besides, protocol-specific information 35 fields of entries in the translation table 21 are not necessary for the UDP session.

(2) When the packet translation module 22 receives a packet of the UDP session, it means that the UDP session is still transceiving data and a proper period of connection time is needed again for the UDP session. Therefore, after determining that the received packet belongs to the UDP session, the control logic 201 resets the connection time 32 associated with the UDP session to $T_{udp}$.

Secondly, in the aspect of ICMP sessions, ICMP, defined in RFC 792 and also based on Internet Protocol, is a standard protocol for exchanging control messages between a router and a host or another router on the Internet. ICMP packets are mainly grouped into two types: packets containing an Identifier field and a Sequence number field (abbr. as Req/Reply packets below), and packets not containing the Identifier field and the Sequence number field (abbr. as non-Req/Reply packets below). The Req/Reply packets, e.g. Echo Request and Echo Reply packets (cf. RFC 792), send requests or replies, while the non-Req/Reply packets don't contain requests or replies.

The property of an ICMP Req/Reply session (transceiving Req/Reply packets only) lies in waiting for a reply packet after transmitting a request packet. In view of this, the present invention adds a count field and an identifier field in the protocol-specific information 35 fields of entries of the translation table 21, and extends the above steps 41-45 for ICMP Req/Reply sessions and ICMP non-Req/Reply sessions (transceiving non-Req/Reply packets only) respectively. For the ICMP Req/Reply sessions, the steps 41-45 are extended as follows:

(1) In the step 41, the packet that the switch controller 2 receives is a request packet, and the NAT/NAPT session established is an ICMP Req/Reply session.

(2) In the step 42, the control logic 201 sets the USED bit 31 of an unused or invalid entry X and stores the connection time 32 (the initial value is $T_{icmp1}$) of the ICMP Req/Reply session. Besides, the control logic 201 fills the identifier of the request packet into the identifier field of the entry X and sets the counter field as 1.

(3) After performing the step 42, when receiving a packet of the ICMP Req/Reply session, the packet translation module 22 compares the source IP, destination IP and identifier of the packet with the source IP 33 and the identifier field of the entry X. If the source IP and identifier is the same as the source IP 33 and the identifier field of the entry X, it means that a request packet is received again, and then the control logic 201 increases the counter field of the entry X by one. If the destination IP and identifier is the same as the source IP 33 and the identifier field of the entry X, it means that a reply packet is received, and then the control logic 201 decreases the counter field of the entry X by one.

(4) In the step 43, U is equal to $U_{icmp1}$. In the step 44, the control logic 201 further checks the counter field in addition to the connection time 32 field. If the value of the counter field is zero, then the control logic clears the USED bit 31 in the step 45 to change the entry into an unused state; if not zero, then returning to the step 43. The concept of the design is that a zero value of the count field means the reply packets corresponding to the transmitted request packets have already been received, thus the ICMP session is ended. Based on this, the USED bit 31 of the associated entry is clear to release the space of the translation table 21.

For the ICMP non-Req/Reply sessions, the steps 41-45 are extended as follows:

(1) In the step 41, the packet that the switch controller 2 receives is a non-Req/Reply packet, and the NAT/NAPT session established is an ICMP non-Req/Reply session.

(2) The initial value T of the connection time 32 in the step 42 is equal to a default $T_{icmp2}$, while the unit time U in the step 43 is equal to $U_{icmp2}$. Besides, protocol-specific information 35 fields of entries in the translation table 21 are not necessary for the ICMP non-Req/Reply session.

Figure 5:
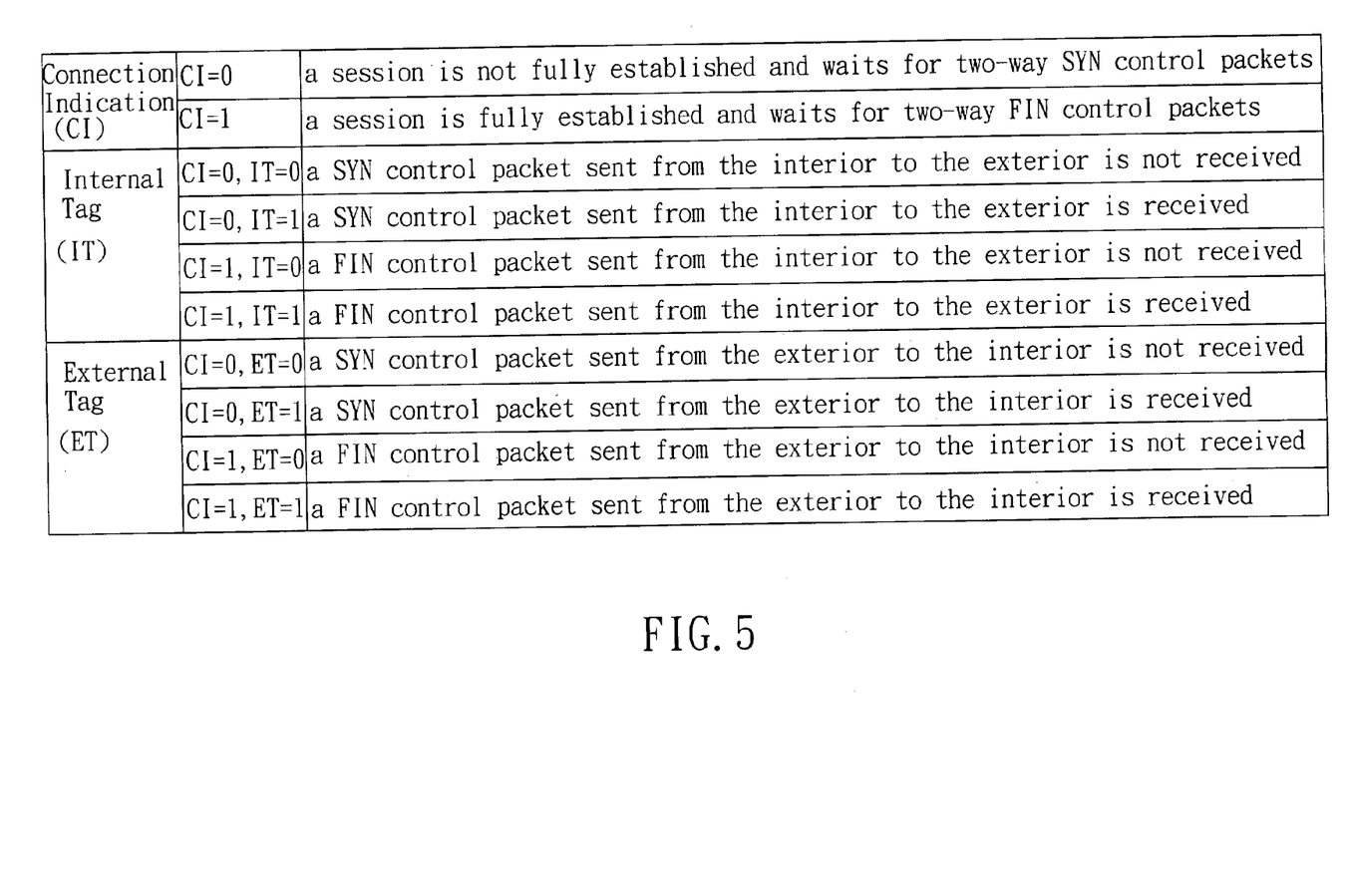
FIG. 5 is a diagram illustrating the implications of Connection Indication, Internal Tag and External Tag in the protocol-specific field of translation table entries for TCP sessions according to the present invention.

Last, in the aspect of TCP sessions, since TCP, defined in RFC 793, is a connection-oriented transport-layer protocol based on Internet Protocol, it needs acknowledgement of both sides to begin/end a connection. Based on this property, the present invention adds a Connection Indication (CI) bit, an Internal Tag (IT) bit and an External Tag (ET) bit in the protocol-specific information 35 fields of entries of the translation table 21, wherein each of these three bits comprises two values of 0 (clear) and 1 (set) whose implications are shown in FIG. 5. In FIG. 5, a SYN control packet is a TCP packet with the SYN flag set, while a FIN control packet is a TCP packet with the FIN flag set. Two-way SYN control packets need to be received to establish a TCP connection. That is, in order to establish a TCP connection with an external network, an internal switch controller must transmit a SYN control packet to the exterior and then receive therefrom a replied SYN control packet, or it must receive a SYN control packet from the exterior and then transmit a replied SYN control packet thereto. Similarly, the internal switch controller must receive two-way FIN control packets to end the TCP connection with the external network. Therefore, these three bits are designed for recording various connection statuses of a TCP session.

Based on connection statuses of a TCP session, the present invention provides three types of connection time 32: $T_{fast}$, $T_{medium}$ and $T_{long}$, wherein $T_{fast} < T_{medium} < T_{long}$, as implied by the suffixes. A detailed explanation about when to use these types of connection time 32 is provided as follows:

$T_{long}$: when a TCP connection is established, a longest connection time 32 is provided so that both sides of the TCP connection have enough time to communicate each other. The actual value of $T_{long}$ is about several hours or longer.

$T_{medium}$: $T_{medium}$ is used in the situation that the switch controller 2 receives a FIN control packet and waits for a replied FIN control packet after a TCP session has been established. At this time, the TCP session is waiting for the connection to be finished, so the connection time 32 of the session is changed from $T_{long}$ to a medium period of time $T_{medium}$, thereby preventing from occupying the translation table 21 too long. The actual value of $T_{medium}$ is about a number of ten minutes.

$T_{fast}$: $T_{fast}$ is used when the switch controller 2 is waiting for a replied SYN control packet during the process of establishing a connection. That is, when the switch controller 2 has transmitted a SYN control packet to the exterior and waits for a replied SYN control packet, or it has received a SYN control packet from the exterior and waits for transmitting thereto a replied SYN control packet, a short period of waiting time is provided.

There is another situation suitable for employing $T_{fast}$. That is, when the switch controller 2 receives two-way FIN control packets, it would wait for a replied ACK control packet (i.e. a TCP packet with the ACK flag set) to assure the ending of the connection. But in addition to that, the controller 2 may receive a "late" packet (i.e. a packet which should be received before the replied FIN control packet) of the original TCP session from the exterior. The cause of this phenomenon is that the late packet is routed more far away than other packets and needs more time to reach the destination address. Nevertheless, this additional period of time is not longer than maximum segment lifetime (MSL, cf. RFC 793). In sum, a long period of waiting time is not necessary for this case, so the connection time 32 would be changed to $T_{fast}$. A special condition is that after the connection time 32 is changed to $T_{fast}$ and before it returns to zero, the switch controller 2 receives a SYN control packet of the original TCP session again for re-establishing a connection. At this time, the controller 2 is waiting for a replied SYN control packet, so the connection time 32 is reset to $T_{fast}$ again. The actual value of $T_{fast}$ is about a number of ten seconds to several minutes.

For a TCP session, based on the above steps 41-45, the packet translation module 22 determines that a TCP packet received by the switch controller 2 is a control packet or an ordinary packet, and then informs the control logic 201 of updating the above three bits, if necessary, to record the most recent status of the TCP session. The control logic 201 further updates the information associated with the TCP session (resetting the connection time 32 to one of $T_{fast}$, $T_{medium}$ and $T_{long}$, or clearing the USED bit 31) according to the connection status recorded in the three bits. Here the flags associated with control packets are mainly RST, FIN and SYN (cf. RFC 793), wherein if these flags are all set in a control packet, then the processing order is RST>FIN>SYN.

Figure 6:
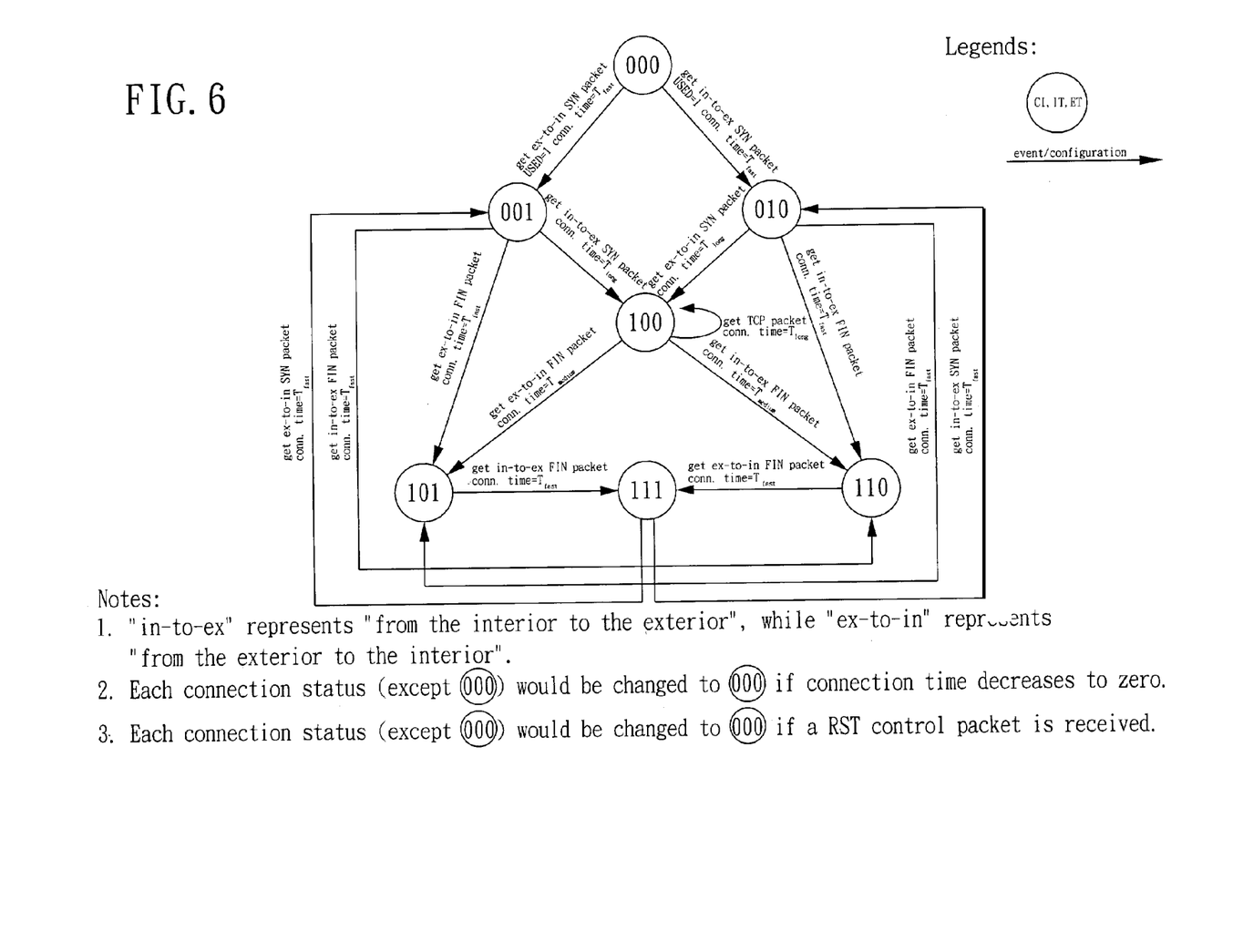
FIG. 6 is a diagram showing variation of connection statuses indicated by the three bits of FIG. 5 for TCP sessions.

FIG. 6 is a diagram illustrating status variation of a TCP session recorded by three bits. {CI, IT, ET} is used below to facilitate describing various connection statuses in FIG. 6. For TCP sessions, the above steps 41-45 are extended according to FIG. 6 as follows:

(1) In the step 41, the packet that the switch controller 2 receives is a TCP packet, and the NAT/NAPT session established is a TCP session.

(2) The initial value T of the connection time 32 in the step 42 is equal to $T_{fast}$, and since a SYN control packet has been received at this time, the connection status would be set to {0,1,0} or {0,0,1}. Besides, the unit time U in the step 43 is equal to $U_{tcp}$ in accordance with the properties of TCP.

(3) After the step 42, if the switch controller 2 receives a replied SYN control packet of the TCP session, the connection status is then changed to {1,0,0} to imply the establishment of the TCP session. Meanwhile, the connection time 32 is changed to $T_{long}$.

(4) After the step 42 and before the establishment of the TCP session, the connection status is {0,1,0} or {0,0,1}. If the switch controller 2 receives any RST control packet (i.e. a TCP packet with the RST flag set) of the TCP session before the connection time reduces to zero, the connection status would become {0,0,0} to reset the TCP connection, and the USED bit 31 of the associated entry in the translation table 21 is also cleared to invalidate the entry.

(5) After the step 42 and also the establishment of the TCP session, if a packet with the SYN, FIN and RST flags cleared of the TCP session is received, then the connection status remains as {1,0,0} and the connection time 32 is restored to $T_{long}$. This is because the TCP session in question is still transceiving data and thus needs to reset the connection time 32 to $T_{long}$, thereby offering enough connection time.

(6) After the step 42, if a FIN control packet is received before the establishment of the TCP session and the RST flag of the FIN control packet is not set, then the connection status is updated as {1,0,1} or {1,1,0} and the connection time 32 is restored to $T_{fast}$.

(7) After the step 42 and also the establishment of the TCP session, if a FIN control packet of the TCP session is received and the RST flag of the FIN control packet is not set, then the connection status is changed from {1,0,0} to {1,0,1} or {1,1,0} and the connection time 32 is changed to $T_{medium}$. After that, if a replied FIN control packet is received, the connection status is updated as {1,1,1} and the connection time 32 is changed to $T_{fast}$. Then, if a SYN control packet of the TCP session is received and the RST and FIN flags of the SYN control packet is not set, the connection status is updated as {0,1,0} or {0,0,1} and the connection time 32 is reset to $T_{fast}$.

While the present invention has been shown and described with reference to preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. An apparatus for Network Address Translation (NAT)/Network Address-Port Translation (NAPT) session management used in a switch controller comprising a packet translation module for performing NAT/NAPT of packets, the switch controller being embodied in hardware, the apparatus comprising:
    a translation table, which is coupled to the packet translation module, comprising a plurality of storage locations, wherein each storage location is used to store related information of a NAT/NAPT session, and the related information comprises at least an indication, a connection bit, and a connection time; and
    a control logic, coupled to the packet translation module and the translation table, accessing the related information, and managing the NAT/NAPT session based on the related information;
    wherein the control logic stores the related information into the translation table,
    wherein the connection time is equal to a predetermined value of T and the indication shows that the related information is valid, then the control logic increases the connection time by a first value every default unit time and changes the indication to show that the related information is invalid if the connection time reaches a first threshold;
    wherein an initial value of the connection bit is false, for indicating whether the session is fully established, and in response to a value of the connection bit becoming true, the control logic sets the connection time as a predetermined value of Tlong when the switch controller receives a second packet of the session and SYN, FIN and RST flags of the second packet are not set,
    a register, which is coupled to and accessed by the control logic, storing the predetermined value T, the unit time, the first value, and the first threshold, and the control logic selecting the predetermined value T, the unit time, the first value and the first threshold based on a protocol which the session uses.

2. The apparatus as recited in claim 1, wherein the translation table is implemented with a cache memory.

3. The apparatus as recited in claim 1, wherein if the indication shows that the related information is invalid, then the control logic reuses a first storage location storing the related information previously in the translation table another NAT/NAPT session and informs the packet translation module of stopping NAT/NAPT of packets of the session.

4. The apparatus as recited in claim 1, wherein if the NAT/NAPT session uses UDP, then the control logic sets the connection time to the predetermined value T when the switch controller receives a first packet of the session.

5. The apparatus as recited in claim 1, wherein if the NAT/NAPT session uses ICMP and transceives only Req/Reply packets, then the related information further comprises a count whose initial value is a predetermined value of C.

6. The apparatus as recited in claim 5, wherein if the switch controller transmits a request packet of the ICMP Req Type session, the count is increased by a second value, and wherein if the switch controller receives a reply packet of the ICMP Reply Type session, the count is decreased by a second value.

7. The apparatus as recited in claim 6, wherein the control logic changes the indication to show that the related information is invalid if the count reaches a second threshold.

8. The apparatus as recited in claim 7, wherein C, the second value and the second threshold are stored in the register and accessed via the control logic.

9. The apparatus as recited in claim 1, wherein the NAT/NAPT session uses TCP, and T is equal to a predetermined value of Tfast; if the switch controller receives a RST control packet of the session, then the control logic changes the indication to show that the related information is invalid.

10. The apparatus as recited in claim 9, wherein the related information further comprises a Connection bit, whose initial value is false, for indicating if the session is fully established.

11. An apparatus for Network Address Translation (NAT)/Network Address-Port Translation (NAPT) session management used in a switch controller comprising a packet translation module for performing NAT/NAPT of packets, the switch controller being embodied in hardware, the apparatus comprising:
    a translation table, which is coupled to the packet translation module, comprising a plurality of storage locations, wherein each storage location is used to store related information of a NAT/NAPT session, and the related information comprises at least an indication and a connection time;
    a control logic, coupled to the packet translation module and the translation table, accessing the related information, and managing the NAT/NAPT session based on the related information;
    wherein the control logic stores the related information into the translation table, wherein the connection time is equal to a predetermined value of T and the indication shows that the related information is valid, then the control logic increases the connection time by a first value every default unit time and changes the indication to show that the related information is invalid if the connection time reaches a first threshold, and the related information further comprises a Connection bit, whose initial value is false, for indicating if the session is fully established, and if the Connection bit is true, the control logic sets the connection time as a predetermined value of Tlong when the switch controller receives a second packet of the session and SYN, FIN and RST flags of the second packet are not set,
    wherein the NAT/NAPT session uses TCP, and T is equal to a predetermined value of Tfast; if the switch controller receives a RST control packet of the session, then the control logic changes the indication to show that the related information is invalid, and a register, which is coupled to and accessed by the control logic, storing the predetermined value T, the unit time, the first value, and the first threshold.

12. An apparatus for Network Address Translation (NAT)/Network Address-Port Translation (NAPT) session management used in a switch controller comprising a packet translation module for performing NAT/NAPT of packets, the switch controller being embodied in hardware, the apparatus comprising:

a translation table, which is coupled to the packet translation module, comprising a plurality of storage locations, wherein each storage location is used to store related information of a NAT/NAPT session, and the related information comprises at least an indication and a connection time;

a control logic, coupled to the packet translation module and the translation table, accessing the related information, and managing the NAT/NAPT session based on the related information;

wherein the control logic stores the related information into the translation table, wherein the connection time is equal to a predetermined value of T and the indication shows that the related information is valid, then the control logic increases the connection time by a first value every default unit time and changes the indication to show that the related information is invalid if the connection time reaches a first threshold, and the related information further comprises a Connection bit, whose initial value is false, for indicating if the session is fully established, and a two-way indication, whose initial value is false, for showing if the switch controller receives one of two-way SYN control packets and two-way FIN control packets; if the Connection bit is false, then when the switch controller receives the two-way SYN control packets of the session, the control logic sets both of the two-way indication and the Connection bit as true, and changes the connection time as a predetermined value of Tlong, wherein the NAT/NAPT session uses TCP, and T is equal to a predetermined value of Tfast; if the switch controller receives a RST control packet of the session, then the control logic changes the indication to show that the related information is invalid, and a register, which is coupled to and accessed by the control logic, storing the predetermined value T, the unit time, the first value, and the first threshold.

13. The apparatus as recited in claim 12, wherein if the Connection bit is false, then when the switch controller receives a FIN control packet of the session, the control logic sets the Connection bit and the two-way indication as true and false respectively, and changes the connection time as Tfast.

14. The apparatus as recited in claim 12, wherein if both the Connection bit and the two-way indication are true, then when the switch controller receives a FIN control packet of the session, the control logic sets the two-way indication as false and changes the connection time as a predetermined value of Tmedium.

15. The apparatus as recited in claim 13, wherein if the Connection bit is true and the two-way indication is false, then when the switch controller receives a replied FIN control packet of the session, the control logic sets the two-way indication as true and changes the connection time as Tfast; next, if the switch controller receives a SYN control packet of the session, the control logic sets both the Connection bit and the two-way indication as false and resets the connection time to Tfast.

16. The apparatus as recited in claim 14, wherein if the Connection bit is true and the two-way indication is false, then when the switch controller receives a replied FIN control packet of the session, the control logic sets the two-way indication as true and changes the connection time as Tfast; next, if the switch controller receives a SYN control packet of the session, the control logic sets both the Connection bit and the two-way indication as false and resets the connection time to Tfast.

17. A switch controller for managing Network Address Translation (NAT)/Network Address-Port Translation (NAPT) sessions, the switch controller being embodied in hardware, comprising:

a translation table having a plurality of storage locations, wherein each storage location is used to store related information of a NAT/NAPT session, and the related information comprises an indication and a connection time;

a packet translation module, coupled to the translation table, performing NAT/NAPT of packets;

a control logic, coupled to the packet translation module and the translation table, accessing the related information, and managing the NAT/NAPT session based on the related information;

wherein the control logic selecting a predetermined value T, the unit time, the first value and the first threshold based on a protocol which the session uses, wherein the control logic stores the related information into the translation table, wherein the connection time is equal to a predetermined value T and the indication shows that the related information is valid, then the control logic increases the connection time by a first value every default unit time and changes the indication to show that the related information is invalid if the connection time reaches a first threshold, and a register, which is coupled to and accessed by the control logic, storing the predetermined value T, the unit time, the first value, and the first threshold.

* * * * *